(12) United States Patent
Bohner et al.

(10) Patent No.: US 8,714,598 B2
(45) Date of Patent: May 6, 2014

(54) HYDRAULIC FLUID COUPLING COMPRISING AN INLINE SWIVEL JOINT

(75) Inventors: Stephan E. Bohner, Woodstock (CA); Robert D. Walker, Strathroy (CA)

(73) Assignee: 2141632 Ontario Inc. (CA)

( * ) Notice: Subject to any disclaimer, the term of this patent is extended or adjusted under 35 U.S.C. 154(b) by 72 days.

(21) Appl. No.: 13/307,777

(22) Filed: Nov. 30, 2011

(65) Prior Publication Data

US 2012/0139233 A1 Jun. 7, 2012

Related U.S. Application Data

(60) Provisional application No. 61/418,385, filed on Nov. 30, 2010.

(51) Int. Cl.
*F16L 27/087* (2006.01)
*F16L 17/00* (2006.01)

(52) U.S. Cl.
USPC .............. 285/98; 285/101; 285/106; 285/276

(58) Field of Classification Search
USPC .............................. 285/98, 101, 106, 276, 277
See application file for complete search history.

(56) References Cited

U.S. PATENT DOCUMENTS

| | | | |
|---|---|---|---|
| 1,532,774 A | 4/1925 | Page | |
| 2,532,669 A * | 12/1950 | Jones | 285/106 |
| 2,542,536 A | 2/1951 | Kirksey | |
| 2,586,991 A | 2/1952 | Postel | |
| 2,676,039 A | 4/1954 | Habig | |
| 2,689,754 A * | 9/1954 | Dunton | 285/18 |
| 2,723,136 A | 11/1955 | Deubler | |
| 2,926,934 A | 3/1960 | Gill | |
| 3,002,869 A | 10/1961 | Hough | |
| 3,291,442 A * | 12/1966 | Cranage | 251/149.1 |
| 3,363,919 A | 1/1968 | Brazell, II | |
| 3,454,299 A | 7/1969 | Hewitt | |
| 4,059,288 A * | 11/1977 | Mohr | 285/2 |
| 4,366,973 A | 1/1983 | Brekke | |
| 4,449,738 A | 5/1984 | Hotger | |
| 4,693,500 A | 9/1987 | Andreson | |
| 4,817,995 A | 4/1989 | Deubler | |
| 4,928,997 A | 5/1990 | Reisener | |
| 4,971,367 A | 11/1990 | Peter et al. | |
| 4,976,282 A | 12/1990 | Kubala | |
| 5,547,233 A | 8/1996 | Hoegger | |
| 5,607,189 A | 3/1997 | Howeth | |

(Continued)

FOREIGN PATENT DOCUMENTS

| | | |
|---|---|---|
| CA | 1181451 A | 1/1985 |
| GB | 2026118 | 1/1980 |
| JP | 4300490 | 10/1992 |

*Primary Examiner* — James Hewitt
(74) *Attorney, Agent, or Firm* — Katten Muchin Rosenman LLP

(57) ABSTRACT

A hydraulic fluid coupling for attaching two hydraulic hoses that comprises an inline swivel joint to prevent twisting of the hoses. The coupling comprises a first and second coupling portion, with the second coupling portion rotatable relative to the first coupling portion. There are two bearings and a ring shaped piston that slides toward the second bearing in response to fluid pressure inside the coupling. Engagement of the piston with the second bearing urges the second coupling portion towards the first coupling portion, against the action of fluid pressure between the first and second couplings. This reduces the load on the first bearing and transfers some of that load to the second bearing, thereby making it easier to rotate the second coupling portion.

19 Claims, 4 Drawing Sheets

(56) References Cited

U.S. PATENT DOCUMENTS

| | | |
|---|---|---|
| 5,617,879 A | 4/1997 | Kubala |
| 5,669,636 A | 9/1997 | Kubala |
| 5,816,624 A | 10/1998 | Smith |
| 5,927,683 A | 7/1999 | Weh |
| 6,164,316 A | 12/2000 | Betti |
| 6,299,219 B1 | 10/2001 | Hoegger |
| 6,752,433 B2 | 6/2004 | Frost |
| 7,229,102 B2 | 6/2007 | Kubala |
| 7,323,968 B2 | 1/2008 | Iwamura |
| 7,597,360 B2 | 10/2009 | Kubala |
| 7,692,553 B2 | 4/2010 | Kubala |
| 7,938,451 B2 | 5/2011 | Taillon |
| 2005/0046114 A1 | 3/2005 | Bohner |
| 2007/0176419 A1 | 8/2007 | Taillon |

\* cited by examiner

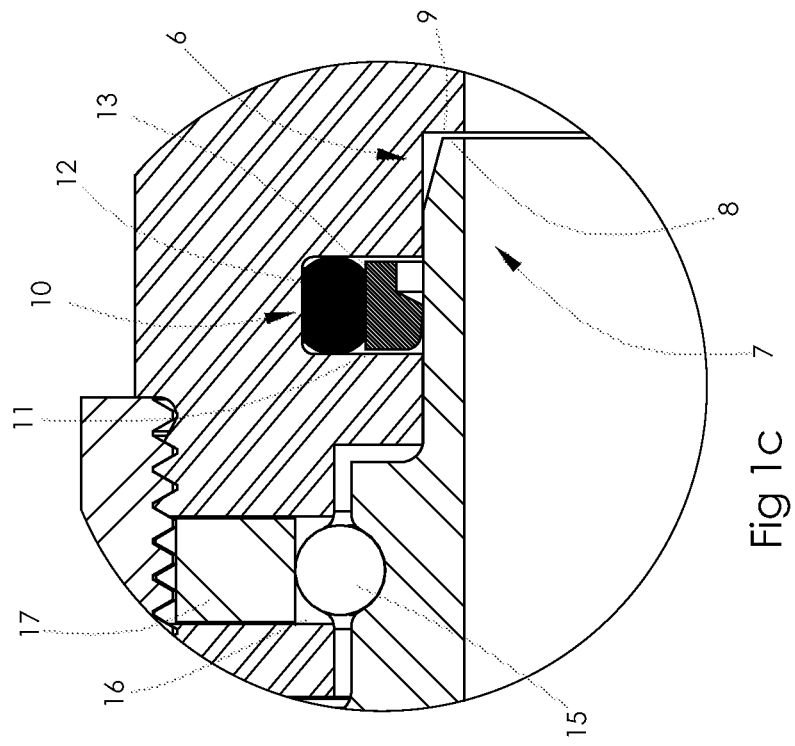
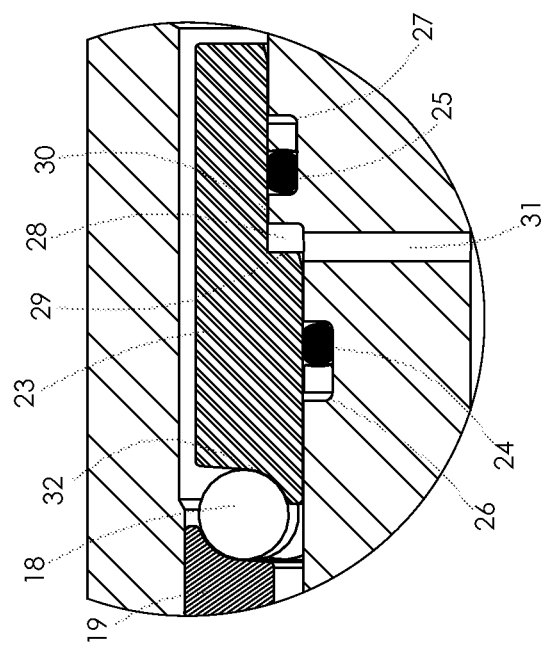
Fig 1c
Fig 1b

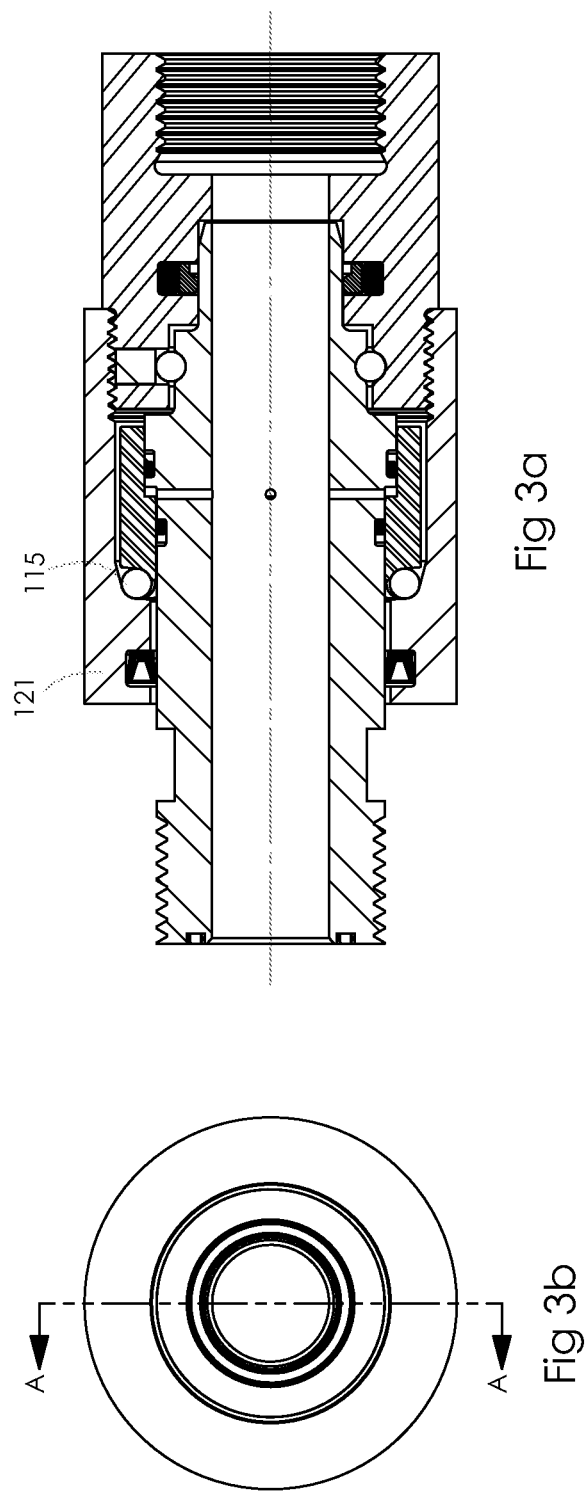

HYDRAULIC FLUID COUPLING COMPRISING AN INLINE SWIVEL JOINT

CROSS-REFERENCE TO RELATED APPLICATIONS

This application claims the benefit of U.S. Patent Application 61/418,385, filed Nov. 30, 2010, the contents of which are incorporated by reference herein.

FIELD OF THE INVENTION

The invention relates to hydraulic fluid couplings. In particular, the invention relates to hydraulic fluid couplings comprising an inline swivel joint to prevent twisting of hydraulic hoses connected via the coupling.

BACKGROUND OF THE INVENTION

Hydraulic fluid couplings are used to connect hydraulic hoses as part of hydraulic fluid power systems on both mobile and stationary power equipment. In instances where the hoses are attached to equipment components that move or twist relative to one another, the coupling must accommodate torsional movement to prevent binding and/or kinking of the hoses. An inline swivel joint is normally employed in these situations.

Prior art hydraulic fluid couplings comprising inline swivel joints have suffered from the problem that, when loaded with internal hydraulic fluid pressure, the swivel becomes difficult to turn. This leads to binding and kinking of the hoses and ultimately hose or coupling failure. The prior art couplings are also prone to excessive bearing wear due to the high loads imparted to the bearings by fluid pressure; this leads to premature bearing failure with the result that the swivel becomes more difficult to turn, exacerbating the hose twisting problem.

As a result, there remains a need for an improved hydraulic fluid coupling, particularly a hydraulic fluid coupling comprising an inline swivel joint. Such a coupling would desirably be easy to turn and not be prone to premature bearing failure.

SUMMARY OF THE INVENTION

The inventive hydraulic fluid coupling is for attaching two hydraulic hoses and comprises an inline swivel joint to prevent twisting of the hoses. The coupling comprises a first and second coupling portion, with the second coupling portion rotatable relative to the first coupling portion. There are two bearings and a ring shaped piston that slides toward the second bearing in response to fluid pressure inside the coupling. Engagement of the piston with the second bearing urges the second coupling portion towards the first coupling portion, against the action of fluid pressure between the first and second couplings. This reduces the load on the first bearing and transfers some of that load to the second bearing, thereby making it easier to rotate the second coupling portion.

According to an aspect of the present invention, there is provided a hydraulic fluid coupling comprising an inline swivel joint, the coupling comprising: a first coupling portion having a central conduit axis; a second coupling portion co-axially aligned with the first coupling portion and having a coupling face perpendicular to the conduit axis abutting the first conduit portion; a central conduit passing through the first and second coupling portions along the central conduit axis; a dynamic seal between the first and second coupling portions; a first bearing between the first and second coupling portions co-axial with the central conduit axis; a ring shaped piston circumferentially disposed about an exterior of the second coupling portion and axially moveable therealong, the piston comprising a piston driving surface and a bearing engaging face; a fluid receiving chamber bounded by at least the piston driving surface and the second coupling portion; at least a radial conduit through the second coupling portion between the central conduit and the fluid receiving chamber; a second bearing circumferentially disposed about an exterior of the second coupling portion and co-axial with the central conduit axis, the second bearing engageable by the piston and supporting rotational and axial movement of the second coupling portion.

The coupling may comprise a retaining cap secured to the first coupling portion and extending over the second coupling portion, the second bearing and the piston located between the retaining cap and the second coupling portion. The second bearing may be engaged with the retaining cap by axial movement of the piston in response to fluid pressure in the fluid receiving chamber. Accordingly, forces exerted by the piston on the second bearing may be resisted by the retaining cap, causing the second coupling portion to move axially toward the first coupling portion in response thereto. To facilitate engagement between the piston and the second bearing, the bearing engaging face may have a shape complementary to a curvature of a ball of the second bearing. To facilitate axial movement of the second coupling portion towards the first coupling portion, the fluid receiving chamber may be bounded by a driving surface of the second coupling portion with an area that is selected to be complementary to the area of the piston driving surface. For example, the area of the driving surface of the second coupling portion may be equal to the area of the piston driving surface.

The area of the piston driving surface and/or the driving surface of the second coupling portion may be sized to transfer a predetermined proportion of an axial load on the first bearing to the second bearing through action of the hydraulic fluid on the piston. For example, the area of the piston driving surface and/or the driving surface of the second coupling portion may be sized to substantially equalize the axial load on the first bearing and the second bearing. The axial load on the first bearing may be due to shear between the first coupling portion and the second coupling portion caused by action of hydraulic fluid pressure on a pressurized portion of the coupling face of the second coupling portion. The axial load on the second bearing may be entirely due to action of the piston. Since the second bearing is immovable, engagement of the piston with the second bearing may cause the second coupling portion to move axially toward the first coupling portion, countering the shear forces on the first bearing, due to fluid pressure against the driving surface of the piston and/or second coupling portion.

The area of the driving surfaces may be from 0.3 to 1.5 times the pressurized area of the coupling face. The pressurized area of the coupling face is the area perpendicular to the conduit axis bounded by the dynamic seal. The area of the driving surfaces may be a fraction x of the pressurized area of the coupling face determined, within a tolerance of 25%, according to the formula: $x = N_2 d_2 / (N_2 d_2 + N_1 d_1)$ where, $N_2$ is a number of balls in the second bearing; $N_1$ is a number of balls in the first bearing; $d_2$ is a diameter of the balls in the second bearing; and, $d_1$ is a diameter of the balls in the first bearing. When the diameter of the balls in the two bearings, $d_2$ and $d_1$, are the same size, the formula for x simplifies to $x = N_2 / (N_2 + N_1)$. $N_2$ may be larger than $N_1$.

The coupling may further comprise a static seal between the second coupling portion and the piston. The coupling may further comprises two static seals between the second coupling portion and the piston on either side of the fluid receiving chamber spaced apart along the conduit axis by a distance sufficient to maintain sealing of the chamber regardless of movement of the piston. The static seals may be disposed within enlarged circumferential grooves to accommodate axial movement of the seals with the piston. The coupling may comprise a single dynamic seal. This may advantageously reduce the torque required to rotate the second coupling portion relative to the first coupling portion as compared with multiple dynamic seals. The dynamic seal may be located between the first and second coupling portions proximal the coupling face in order to reduce the pressurized area of the coupling face and thereby reduce the load on the bearings. The first and second bearings may be on the same side of the dynamic seal and may be spaced apart along a length of the second coupling portion in order to stabilize it during rotation.

Hydraulic hoses may be connected to the first and second coupling portions by any suitable means, including crimp or compression fittings, threaded connections, or slidingly releasable hose attachments.

Further features of the invention will be described or will become apparent in the course of the following description.

BRIEF DESCRIPTION OF THE DRAWINGS

In order that the invention may be more clearly understood, embodiments thereof will now be described in detail by way of example, with reference to the accompanying drawings, in which:

FIG. 1b is an enlarged view of the portion of FIG. 1a denoted by the circle B;

FIG. 1c is an enlarged view of the portion of FIG. 1a denoted by the circle C;

FIG. 2b is a side sectional view of FIG. 2a;

FIG. 3a is a sectional side view of another embodiment of a hydraulic fluid coupling comprising an inline swivel according to the present invention; and, FIG. 3b is an end view of the hydraulic fluid coupling of FIG. 3a.

DESCRIPTION OF PREFERRED EMBODIMENTS

Figure 1A:
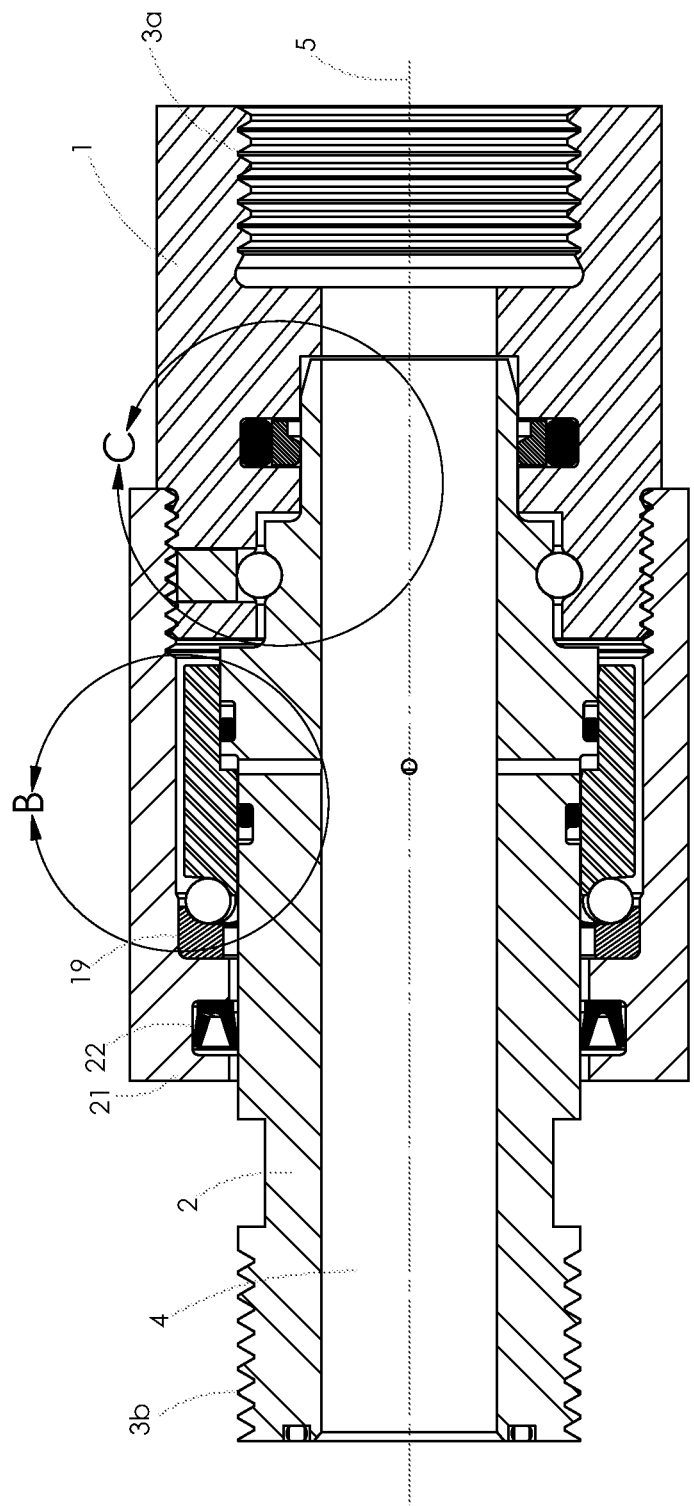
FIG. 1a is a sectional side view of an embodiment of a hydraulic fluid coupling comprising an inline swivel according to the present invention.

In describing the figures, like features are referred to by like reference numerals. Although not all features indicated on a particular drawing are necessarily described with reference to that drawing, all of the features are described with reference to at least one of the drawings.

Referring to FIGS. 1a to 1c, a hydraulic fluid coupling according to the invention comprises a first coupling portion 1 and a second coupling portion 2. Each coupling portion comprises connection means for hydraulic hoses in the form of female threads 3a on the first coupling portion and male threads 3b on the second coupling portion. A hydraulic fluid conduit 4 is formed through the first and second coupling portions 1, 2 that has a central conduit axis 5. The first coupling portion 1 comprises an axial recess 6 into which a complementary nose 7 of the second coupling portion 2 is fitted. The nose 7 has a coupling face 8, at least a portion of which adjoins with an interior face 9 of the recess 6. The coupling face 8 has a pressurized area that is perpendicular to the conduit axis 5 that defines the hydraulic force acting on the second coupling portion 2. The hydraulic forces acting to force apart the first and second coupling portions 1, 2 are equally applied to both coupling portions and are proportional to the diameter of the nose 7.

A dynamic seal 10 is provided between the first and second coupling portions. In the embodiment shown, the dynamic seal 10 is fitted within an annular recess 11 in the first coupling portion 1, although it could alternatively have been provided within an annular recess on the second coupling portion. The seal 10 comprises an elastomeric portion 12 and a glide element 13, in a configuration as is known in the art; other known dynamic seal configurations may also be used. The dynamic seal 10 is of a type that permits rotational movement of the second coupling portion 2 relative to the first coupling portion 1 (or vice versa), while still maintaining a sealing relationship between the first and second coupling portions. Fluid pressure is applied to both coupling portions 1, 2 in a pressurized region from the conduit up to the dynamic seal 10. The dynamic seal 10 is shaped such that fluid pressure causes it to deform radially in a manner that increases its contact with the second coupling portion 2; the degree of sealing therefore increases with increasing fluid pressure. When placed under pressure, this type of seal usually imparts a relatively high degree of friction to the rotational movement and, in order to reduce that friction and allow the coupling portions 1, 2 to rotate more freely relative to one another, it is desirable to reduce the number of dynamic seals 10. Accordingly, in a preferred embodiment, the hydraulic coupling is provided with a single dynamic seal 10. The dynamic seal is able to resist hydraulic fluid pressures of up to 2000 psi, preferably up to 5000 psi, more preferably up to 8,000 psi, yet more preferably up to 10,000 psi.

A first bearing 15 is located between the first and second coupling portions 1, 2 co-axial with the conduit axis 5 and comprises a plurality of balls loaded into a first bearing recess 16 via a fill port 17. The first bearing recess 16 is mutual to both the first and second coupling portions and, by loading the balls, the coupling portions 1, 2 are locked together against axial movement, but still permitted to rotate about the central conduit axis 5 relative to one another. Hydraulic fluid pressure applied to the coupling face 8 that forces apart the conduit portions 1, 2 places the first bearing 15 in shear, which axially loads the bearing and makes it difficult to turn. It would therefore be desirable to relieve some of the load on the first bearing 15 in order to make it easier to turn and to reduce wear, thereby prolonging the lifetime of the hydraulic fluid coupling.

A second bearing 18 is provided to relieve some of the load applied to the first bearing 15. The second bearing 18 is circumferentially disposed about an exterior of the second coupling portion 2 and is co-axial with the central conduit axis 5. The second bearing 18 comprises a plurality of balls resting within a bearing spacer 19 having complementary curvature. In this embodiment, the spacers are abutted within a retaining cap 21 that is threaded to the first coupling portion 1 and extends over the exterior of the second coupling portion 2. Removal of the retaining cap 21 allows the spacer 19 and the balls of the second bearing 18 to be inserted through the open end and lubricated; however, once threaded to the first coupling portion 1, forces applied to the retaining cap 21 are transmitted to the first coupling portion. A dust seal 22 is provided in the retaining cap 21, but this serves no hydraulic fluid sealing function and imparts relatively little rotational friction to the second coupling portion 2.

A ring shaped piston 23 is circumferentially disposed about the exterior of the second coupling portion 2 in a manner that permits sliding axial movement. Both the second bearing 18 and the piston 23 are located in the annular space between the retaining cap 21 and the second coupling portion 2. The piston 23 is sized with close tolerance to the exterior of the second coupling portion 2 so that engagement is provided with a pair of static seals 24, 25 located within circumferential grooves 26, 27 on the second coupling portion. This tends to cause the piston 23 to rotate with the second coupling portion 2. The grooves 26, 27 are spaced apart by a distance sufficient to maintain sealing regardless of movement of the piston 23. The static seals 24, 25 are of the O-ring type and comprise a backup ring to prevent extrusion of the O-ring from the groove in response to fluid pressure. The static seals 24, 25 are therefore not dynamic seals; they have no special shape or design features causing them to deform radially in response to hydraulic fluid pressure. As such, the rotational friction imparted to the second coupling portion 2 by the seals 24, 25 is significantly less than that imparted by dynamic seals.

The seals 24, 25 are provided on either side of a fluid receiving chamber 28 formed between a piston driving surface 29 of the piston 23 and a complementary driving surface 30 formed by a radially enlarged area of the second coupling portion 2. The driving surfaces 29, 30 each have an area that is perpendicular to the conduit axis 5; this is considered the driving area of the piston, regardless of the specific shape of the surface. The area thus defined of the driving surfaces 29, 30 is equal. The axial forces exerted by fluid pressure in the receiving chamber 28 on the piston 23 and the second coupling portion 2 are therefore equal in magnitude but opposite in direction. Fluid pressure is provided to the receiving chamber 28 through one or more radial conduits 31 through the second coupling portion 2, linking the central conduit 4 with the receiving chamber 28. In the embodiment shown, there are four radial conduits 31.

The piston 23 has a bearing engaging face 32 with a shape complementary to the balls of the second bearing 18. Fluid pressure in the receiving chamber 28 causes the piston 23 to axially move into engagement with the second bearing 18, which is urged toward the bearing spacer 19 that abuts the retaining cap 21. An axial load is thus imparted to the second bearing 18 through action of hydraulic fluid pressure on the piston driving surface 29. An equal axial load is imparted in an opposite direction to the second coupling portion 2 through action of hydraulic fluid pressure on the second coupling portion driving surface 30. Since the bearing spacer 19 and retaining cap 21 cannot move relative to the first coupling portion 1, the second coupling portion 2 is urged towards the first coupling portion 1. This relieves some of the axial load imparted to the first bearing 15 by action of fluid pressure on the coupling face 8. The first bearing 15 is thus relieved of load, reducing its resistance to rotation of the second coupling portion 2 about the conduit axis 5.

This, of course, comes at the expense of an axial load imparted to the second bearing 18. Since both the driving force on the piston 23 and the coupling face 8 are a function of hydraulic fluid pressure in the conduit 4, the area of the driving surfaces 29, 30 can be sized to transfer a pre-determined proportion of the axial load on the first bearing 15 to the second bearing 18. Through careful selection of the area of the driving surfaces 29, 30, the axial loads and/or the resistance to torsion of the first and second bearings 15, 18 can be substantially equalized, thus making it easier overall for the second coupling portion 2 to rotate about the axis 5 and reducing wear on the bearings. For example, in one embodiment, the area of the driving surfaces 29, 30 is preferably in the range of from 0.3 to 1.5 times the pressurized area of the coupling face 8.

The frictional resistance to torsion of the bearings 15, 18 is a function of both axial load and area being loaded; since, in the embodiment shown, the second bearing 18 has a diameter that is larger than the first bearing 15, in order to equalize the resistance to torsion the axial loads are not necessarily equal. The area of the bearings is roughly proportional to the number of balls in the bearing, particularly in cases where the diameter of all balls are equal. Therefore, in one embodiment, the area of the driving surfaces 29, 30 is a fraction x of a pressurized area of the coupling face 8 determined, within a tolerance of 25%, according to the formula:

$$x = N_2 d_2 / (N_2 d_2 + N_1 d_1)$$

where,
$N_2$ is a number of balls in the second bearing;
$N_1$ is a number of balls in the first bearing;
$d_2$ is a diameter of the balls in the second bearing; and,
$d_1$ is a diameter of the balls in the first bearing.

In cases where the diameter of the balls in the first and second bearings 15, 18 are equal, the formula simplifies to $x = N_2 / (N_2 + N_1)$. When $N_2$ is larger than $N_1$, the value of x is greater than 0.5. When $N_2$ equals $N_1$, the value of x equals 0.5.

Figure 2A:
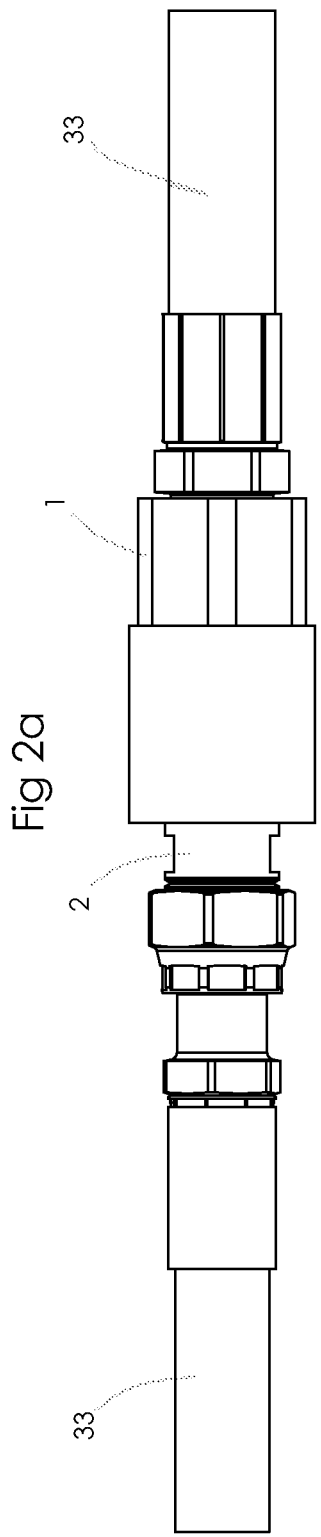
FIG. 2a is a side view of the coupling of FIG. 1a, shown connecting two hydraulic hoses.
Figure 2B:
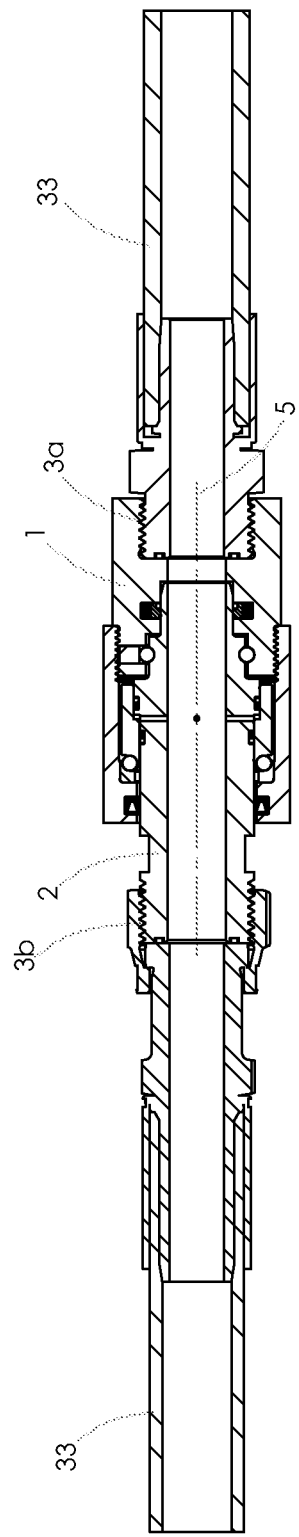

Referring to FIGS. 2a and 2b, the hydraulic fluid coupling is shown interconnected with a pair of hydraulic hoses 33 connected to the female and male threads 3a, 3b of the first and second coupling portions 1, 2, respectively. The hoses are therefore able to rotate about the conduit axis 5 relative to one another with reduced propensity for kinking and binding due to the features of the hydraulic coupling described above, which provide reduced torsional requirements for rotation. Although shown here with threaded connections, other means of connecting hydraulic hoses known to persons skilled in the art may be employed.

Referring to FIGS. 3a and 3b, another embodiment of the fluid coupling is shown that is similar in all respects to the coupling described with reference to FIGS. 1 and 2, except that the bearing spacer 19 is integrated with the retaining cap 21. The retaining cap 121 of this embodiment is thus provided with an interior curvature complementary to the curvature of the balls selected for the second bearing 115. Although this reduces flexibility in the choice of ball diameter, it reduces cost and complexity from a manufacturing perspective.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A hydraulic fluid coupling comprising an inline swivel joint, the coupling comprising:
   a first coupling portion having a central conduit axis;
   a second coupling portion co-axially aligned with the first coupling portion and having a coupling face perpendicular to the conduit axis abutting the first coupling portion;
   a central conduit passing through the first and second coupling portions along the central conduit axis;
   a dynamic seal between the first and second coupling portions;
   a first bearing between the first and second coupling portions co-axial with the central conduit axis;
   a ring shaped piston circumferentially disposed about an exterior of the second coupling portion and axially moveable therealong, the piston comprising a piston driving surface and a bearing engaging face;
a fluid receiving chamber bounded by at least the piston driving surface and the second coupling portion;
at least a radial conduit through the second coupling portion between the central conduit and the fluid receiving chamber;
a second bearing circumferentially disposed about an exterior of the second coupling portion and co-axial with the central conduit axis, the second bearing engageable by the piston and supporting rotational and axial movement of the second coupling portion; and,
a retaining cap secured to the first coupling portion and extending over the second coupling portion, the second bearing and the piston located between the retaining cap and the second coupling portion, wherein pressurized hydraulic fluid is able to pass through the coupling portions, through the radial conduit and into the fluid receiving chamber to create fluid pressure in the receiving chamber.

2. The hydraulic fluid coupling according to claim 1, wherein the second bearing is engageable with the retaining cap by axial movement of the piston in response to fluid pressure in the fluid receiving chamber.

3. The hydraulic fluid coupling according to claim 2, wherein forces exerted by the piston on the second bearing are resisted by the retaining cap, causing the second coupling portion to move axially toward the first coupling portion in response thereto.

4. The hydraulic fluid coupling according to claim 1, wherein the bearing engaging face has a shape complementary to a curvature of a ball of the second bearing.

5. The hydraulic fluid coupling according to claim 1, wherein the fluid receiving chamber is bounded by a driving surface of the second coupling portion that is equal in area to the piston driving surface.

6. The hydraulic fluid coupling according to claim 1, wherein the piston driving surface has an area that is sized to transfer a predetermined proportion of an axial load on the first bearing to the second bearing through action of the hydraulic fluid on the piston.

7. The hydraulic fluid coupling according to claim 6, wherein the piston driving surface area is sized to substantially equalize the axial load on the first bearing and the second bearing.

8. The hydraulic fluid coupling according to claim 6, wherein the piston driving surface area is from 0.3 to 1.5 times a pressurized area of the coupling face of the second coupling portion.

9. The hydraulic fluid coupling according to claim 6, wherein the piston driving surface area is a fraction x of a pressurized area of the coupling face of the second coupling portion determined, within a tolerance of 25%, according to the formula:

$$x = N_2 d_2 / (N_2 d_2 + N_1 d_1)$$

where,
$N_2$ is a number of balls in the second bearing;
$N_1$ is a number of balls in the first bearing;
$d_2$ is a diameter of the balls in the second bearing; and,
$d_1$ is a diameter of the balls in the first bearing.

10. The hydraulic fluid coupling according to claim 9, wherein $d_2$ and $d_1$ are equal.

11. The hydraulic fluid coupling according to claim 9, wherein $N_2$ is larger than $N_1$.

12. The hydraulic fluid coupling according to claim 6, wherein the axial load on the first bearing is due to shear between the first and second coupling portions.

13. The hydraulic fluid coupling according to claim 6, wherein the piston exerts a force in the same direction as a force on the coupling face and wherein the second coupling portion is urged in an opposite direction to thereby reduce the axial load on the first bearing.

14. The hydraulic fluid coupling according to claim 1, wherein the coupling further comprises a static seal between the second coupling portion and the piston.

15. The hydraulic fluid coupling according to claim 14, wherein the coupling further comprises two static seals between the second coupling portion and the piston on either side of the fluid receiving chamber spaced apart along the conduit axis by a distance sufficient to maintain sealing of the chamber regardless of movement of the piston.

16. The hydraulic fluid coupling according to claim 1, wherein the coupling comprises a single dynamic seal.

17. The hydraulic fluid coupling according to claim 1, wherein the dynamic seal is proximal the coupling face.

18. The hydraulic fluid coupling according to claim 1, wherein the first and second bearing are on the same side of the dynamic seal and are spaced apart along a length of the second coupling portion.

19. The hydraulic fluid coupling according to claim 1, wherein the first and second coupling portions include connection means for hydraulic hoses.

* * * * *